US012771798B2

(12) United States Patent
Kimura

(10) Patent No.: US 12,771,798 B2
(45) Date of Patent: Oct. 20, 2026

(54) IMAGE FORMING APPARATUS

(71) Applicant: KYOCERA Document Solutions Inc., Osaka (JP)

(72) Inventor: Atsushi Kimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 251 days.

(21) Appl. No.: 18/740,910

(22) Filed: Jun. 12, 2024

(65) Prior Publication Data

US 2024/0422277 A1 Dec. 19, 2024

(30) Foreign Application Priority Data

Jun. 19, 2023 (JP) ................................ 2023-099905

(51) Int. Cl.
*H04N 1/193* (2006.01)
*H04N 1/32* (2006.01)

(52) U.S. Cl.
CPC ......... *H04N 1/193* (2013.01); *H04N 1/32635* (2013.01); *H04N 1/32657* (2013.01); *H04N 2201/0081* (2013.01)

(58) Field of Classification Search
USPC ............... 358/1.1–3.29, 1.11–1.18, 304–305, 358/504–516, 474–498; 714/100, 26, 714/46–49
See application file for complete search history.

(56) References Cited

U.S. PATENT DOCUMENTS 6,671,421 B1 * 12/2003 Ogata ................ H04N 1/00045 382/284
2014/0347712 A1 * 11/2014 Yoneyama ......... H04N 1/00816 358/498
2015/0288839 A1 * 10/2015 Sohara ............... H04N 1/00092 358/474
2018/0130192 A1 5/2018 Yago
2018/0213117 A1 * 7/2018 Momose .............. H04N 1/3873
2021/0218865 A1 * 7/2021 Tsuchiya .................. H04N 1/60

FOREIGN PATENT DOCUMENTS

JP 2018078366 A 5/2018

OTHER PUBLICATIONS

Noro Toshitaka; Image Formation Apparatus; 2020 (Year: 2020).*

* cited by examiner

*Primary Examiner* — Marcellus J Augustin
(74) *Attorney, Agent, or Firm* — Alleman Hall LLP

(57) ABSTRACT

A plurality of line sensors are disposed along a width direction intersecting a sheet conveying direction with respective positions in the width direction partially overlapping with each other, and configured to read images of a plurality of partial areas from the sheet, each of the partial areas including a non-overlapping area which does not overlap with an adjacent area and an overlapping area which overlaps with an adjacent area, each of which is a part of a sheet passing area in the width direction. An image judgment portion judges whether or not data of each of a plurality of read images obtained by the plurality of line sensors satisfies a tolerance condition based on a corresponding reference image data item. An error processing portion executes predetermined error processing when it is judged that the data of any of the plurality of read images does not satisfy the tolerance condition.

2 Claims, 7 Drawing Sheets

IMAGE FORMING APPARATUS

INCORPORATION BY REFERENCE

This application is based upon and claims the benefit of priority from the corresponding Japanese Patent Application No. 2023-099905 filed on Jun. 19, 2023, the entire contents of which are incorporated herein by reference.

BACKGROUND

The present disclosure relates to an image forming apparatus capable of judging the quality of an image formed on a sheet.

The image forming apparatus includes a printing device that forms an image on a sheet. Further, it is known that the image forming apparatus reads an output image formed on the sheet and judges whether or not there is an abnormality in the output image based on the read image.

SUMMARY

An image forming apparatus according to one aspect of the present disclosure includes a printing device, a plurality of line sensors. an image judgment portion, and an error processing portion. The printing device forms an image on a sheet conveyed along a conveying path. The plurality of line sensors are disposed downstream of the printing device in a sheet conveying direction along a width direction intersecting the sheet conveying direction, with respective positions in the width direction partially overlapping with each other, and read images of a plurality of partial areas from the sheet, each of the partial areas including a non-overlapping area which does not overlap with an adjacent area and an overlapping area which overlaps with an adjacent area, which is a part of a sheet passing area in the width direction. The image judgment portion judges whether or not data of each of a plurality of read images obtained by the plurality of line sensors satisfies a tolerance condition based on a corresponding one of a plurality of reference image data items representing the images of the plurality of partial areas. The error processing portion executes predetermined error processing when it is judged that the data of any of the plurality of read images does not satisfy the tolerance condition.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, embodiments of the present disclosure will be described with reference to the drawings. It is noted that the following embodiments are examples of embodying the present disclosure and do not limit the technical scope of the present disclosure.

First Embodiment: Configuration of Image Forming Apparatus 10

Figure 1:
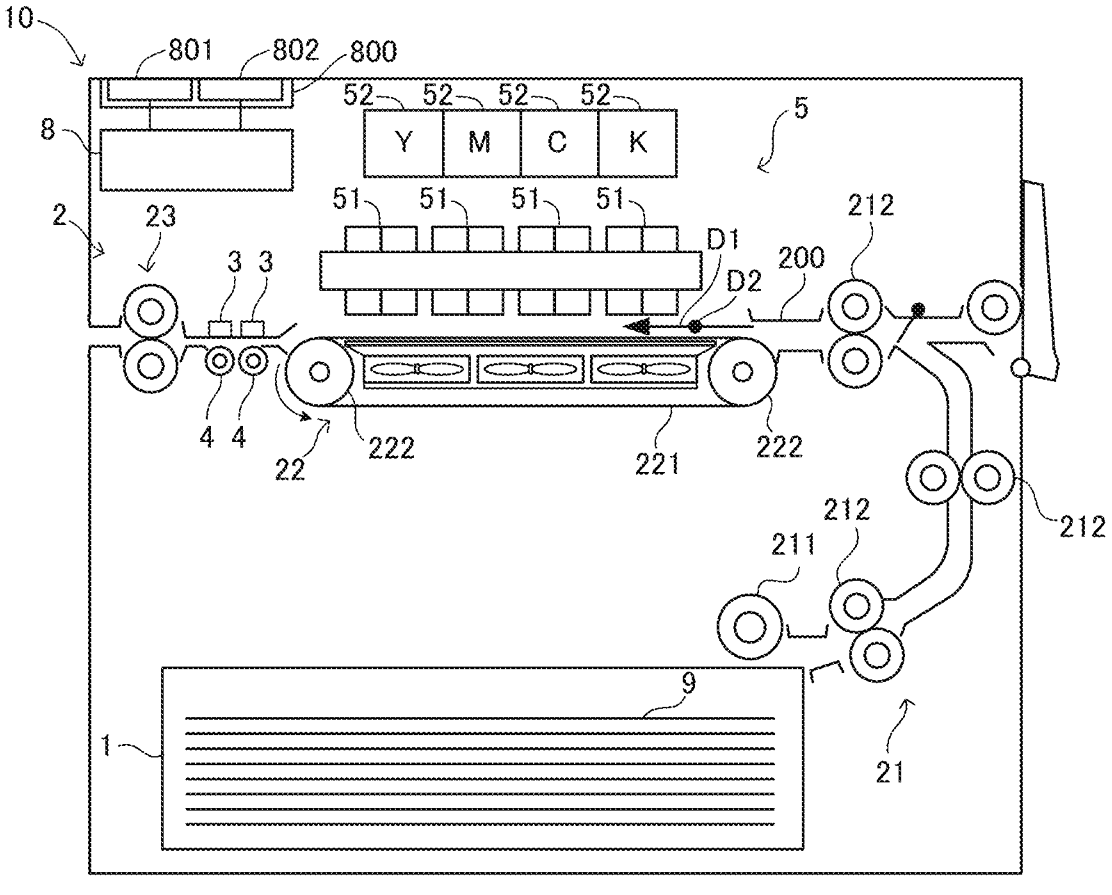
FIG. 1 is a configuration diagram of an image forming apparatus according to a first embodiment.

An image forming apparatus 10 according to a first embodiment includes a sheet storing portion 1, a sheet conveying device 2, and a printing device 5 (see FIG. 1).

The image forming apparatus 10 further includes a human interface device 800 and a control device 8. The control device 8 controls the sheet conveying device 2 and the printing device 5.

The sheet conveying device 2 feeds sheets 9 stored in a sheet storing portion 1 one by one to a conveying path 200. Further, the sheet conveying device 2 conveys the sheets 9 along the conveying path 200.

The sheet conveying device 2 herein includes a primary conveying device 21, a belt conveyor device 22, and a secondary conveying device 23.

The primary conveying device 21 includes a sheet feeding mechanism 211 and a plurality of primary conveying roller pairs 212.

The sheet feeding mechanism 211 feeds the sheets 9 from the sheet storing portion 1 to the conveying path 200. The primary conveying roller pairs 212 convey the sheets 9 along the conveying path 200, and further feeds the sheets 9 to the belt conveyor device 22.

The belt conveyor device 22 takes over the conveyance of the sheets 9 from the primary conveying device 21. The belt conveyor device 22 conveys the sheets 9 along the conveying path 200, and further feeds the sheets 9 to the secondary conveying device 23.

The belt conveyor device 22 includes a conveying belt 221 and a plurality of support rollers 32. The belt conveyor device 22 further includes a motor (not shown) that rotates one of the plurality of support rollers 32.

The conveying belt 221 is an endless belt member. The conveying belt 221 is rotatably supported by the plurality of support rollers 32. As one of the plurality of support rollers 32 rotates, the conveying belt 221 rotates.

The belt conveyor device 22 conveys the sheets 9 fed onto the conveying belt 221 by the primary conveying device 21 along the upper surface of the conveying belt 221. The belt conveyor device 22 feeds the sheets 9 from the upper surface of the conveying belt 221 to the secondary conveying device 23. The area along the upper surface of the conveying belt 221 is a part of the conveying path 200.

The secondary conveying device 23 takes over the conveyance of the sheets 9 from the belt conveyor device 22. The secondary conveying device 23 conveys the sheets 9 along the conveying path 200, and further feeds the sheets 9 from the conveying path 200 to a post-stage portion (not shown). For example, the post-stage portion is a discharge tray, a post-processing device, a relay conveying device, or the like.

The printing device 5 executes print processing. The print processing is processing for forming an image on a sheet 9 conveyed along the conveying path 200.

In the present embodiment, the printing device 5 forms an image on the sheet 9 conveyed by the belt conveyor device 22. In the example shown in FIG. 1, the printing device 5 executes the print processing using an inkjet method.

In the example shown in FIG. 1, the printing device 5 includes a plurality of inkjet units 51 corresponding to a plurality of colors, respectively, and a plurality of ink supply portions 52.

The plurality of ink supply portions 52 supply ink of different colors to the plurality of inkjet units 51, respectively. The plurality of inkjet units 51 form an image on the sheet 9 by ejecting ink onto the sheet 9.

It is noted that the printing device 5 may be a device that executes the print processing using a method other than the inkjet method, such as an electrophotographic method.

[Human Interface Device 800]

The human interface device 800 includes an operation device 801 and a display device 802.

The operation device 801 is a device that detects a human operation. For example, the operation device 801 includes one or both of a touch panel and a push button.

The display device 802 is a device that displays various types of information. For example, the display device 802 is a panel display device such as a liquid crystal display panel.

[Control Device 8]

The control device 8 includes a central processing unit (CPU) 81, a random access memory (RAM) 82, a secondary storage device 83, a signal interface 84, a communication device 85, and the like.

The secondary storage device 83 is a computer-readable nonvolatile storage device. The secondary storage device 83 can store and update computer programs and various types of data. For example, one or both of a flash memory and a hard disk drive are employed as the secondary storage device 83.

The signal interface 84 converts signals output from various sensors into digital data, and transmits the converted digital data to the CPU 81. Further, the signal interface 84 converts the control command output from the CPU 81 into a control signal, and transmits the control signal to the device to be controlled.

The communication device 85 executes communication with another apparatus such as a host apparatus 7. The CPU 81 communicates with another apparatus through the communication device 85. The host apparatus 7 is an information processing apparatus such as a personal computer.

Figure 2:
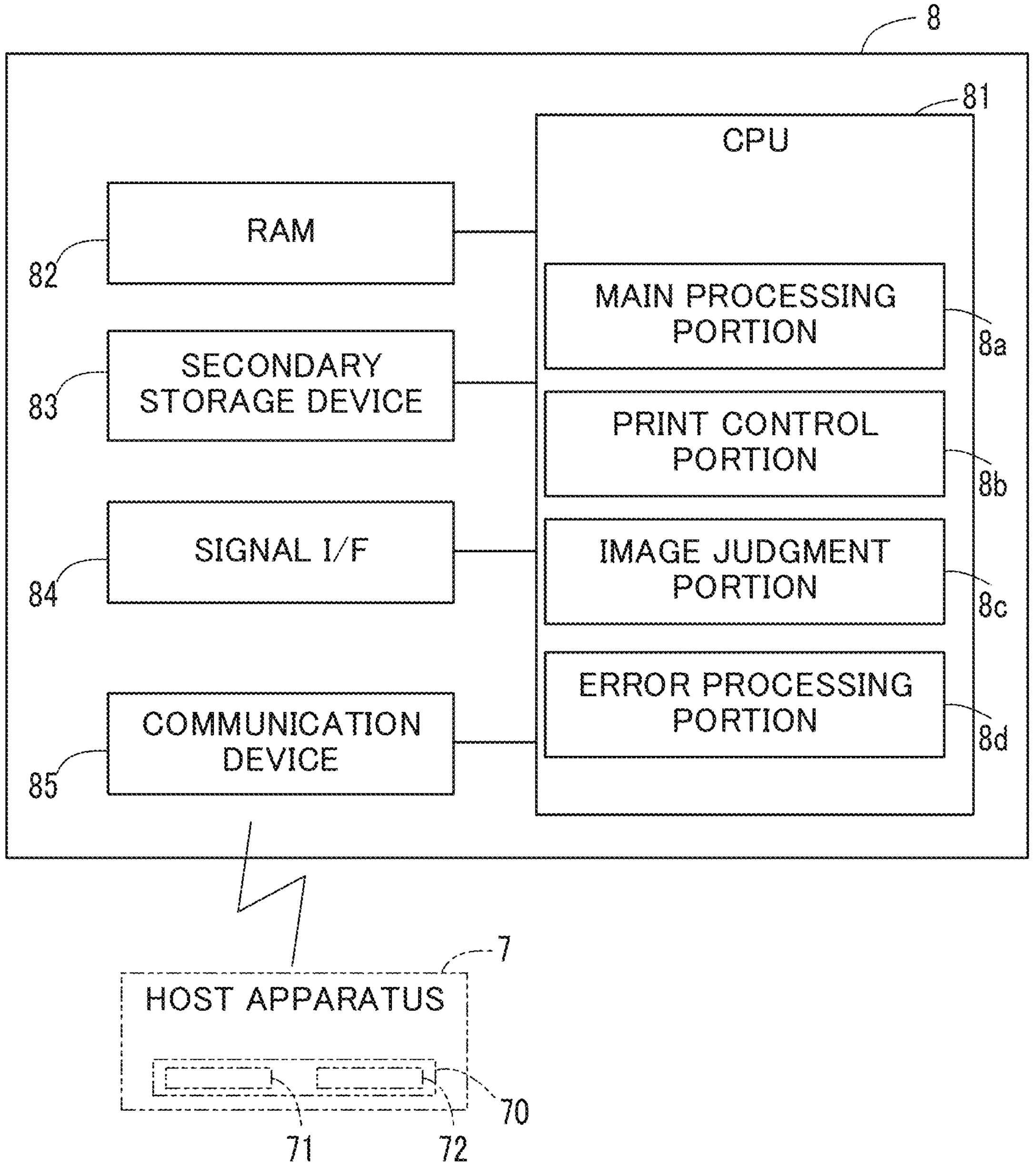
FIG. 2 is a block diagram showing a configuration of a control device in the image forming apparatus according to the first embodiment.

The host apparatus 7 includes a human interface device 70 including an operation portion 71 and a display portion 72 (see FIG. 2). For example, the operation portion 71 includes one or more of a touch panel, a keyboard, and a mouse. The display portion 72 is, for example, a liquid crystal display.

The CPU 81 is a processor that executes various types of data processing and control by executing the computer programs. The control device 8 including the CPU 81 controls the sheet conveying device 2, the printing device 5, and the like.

The RAM 82 is a computer-readable volatile storage device. The RAM 82 temporarily stores the computer programs to be executed by the CPU 81 and data to be output and referred to while the CPU 81 is executing various types of processing.

The CPU 81 includes a plurality of processing modules implemented by executing the computer programs. The plurality of processing modules include a main processing portion 8*a*, a print control portion 8*b*, and the like.

The main processing portion 8*a* executes processing for starting various types of processing in response to occurrence of various processing events, and the like. The processing events include an operation event, a reception event, and the like.

The operation event is an event in which operations of various processing requests have been detected by the operation device 801. The reception event is an event in which commands of various processing requests have been received through the communication device 85. The processing requests include a print request for requesting execution of the print processing.

The print control portion 8*b* controls the sheet conveying device 2 and the printing device 5. The print control portion 8*b* controls the conveyance of the sheet 9 by controlling the sheet conveying device 2.

Further, the print control portion 8*b* causes the printing device 5 to execute the print processing in synchronization with the conveyance of the sheet 9 by the sheet conveying device 2.

For example, when the print request is received by the communication device 85, the print control portion 8*b* causes the sheet conveying device 2 to convey the sheet 9, and causes the printing device 5 to execute the print processing.

The image forming apparatus 10 can execute image inspection processing to be described later. The image inspection processing is processing for reading an output image formed on the sheet 9 and judging whether or not where is an abnormality in the output image based on the read image.

By the way, the output image formed on the sheet 9 is read by a line sensor. Generally, a line sensor having a length corresponding to the maximum width of the sheet 9 that may be used is employed.

When line sensors having different lengths are employed for different models with different maximum sheet 9 widths, it is necessary to manage many types of line sensors. On the other hand, it is desirable that parts can be shared among a plurality of models.

The image forming apparatus 10 has a configuration suitable for sharing the line sensor used for judging the quality of the output image among a plurality of models. Hereinafter, the configuration will be described.

In the following description, a direction in which the sheet 9 is conveyed along the conveying path 200 will be referred to as a sheet conveying direction D1 (see FIG. 1 and FIG. 3). A direction intersecting the sheet conveying direction D1 will be referred to as a width direction D2 (see FIG. 1 and FIG. 3).

The width direction D2 corresponds to the main scanning direction in the printing device 5. The sheet conveying direction D1 is also a direction along the sub-scanning direction in the printing device 5. In the present embodiment, the width direction D2 is a direction orthogonal to the sheet conveying direction D1.

Figure 3:
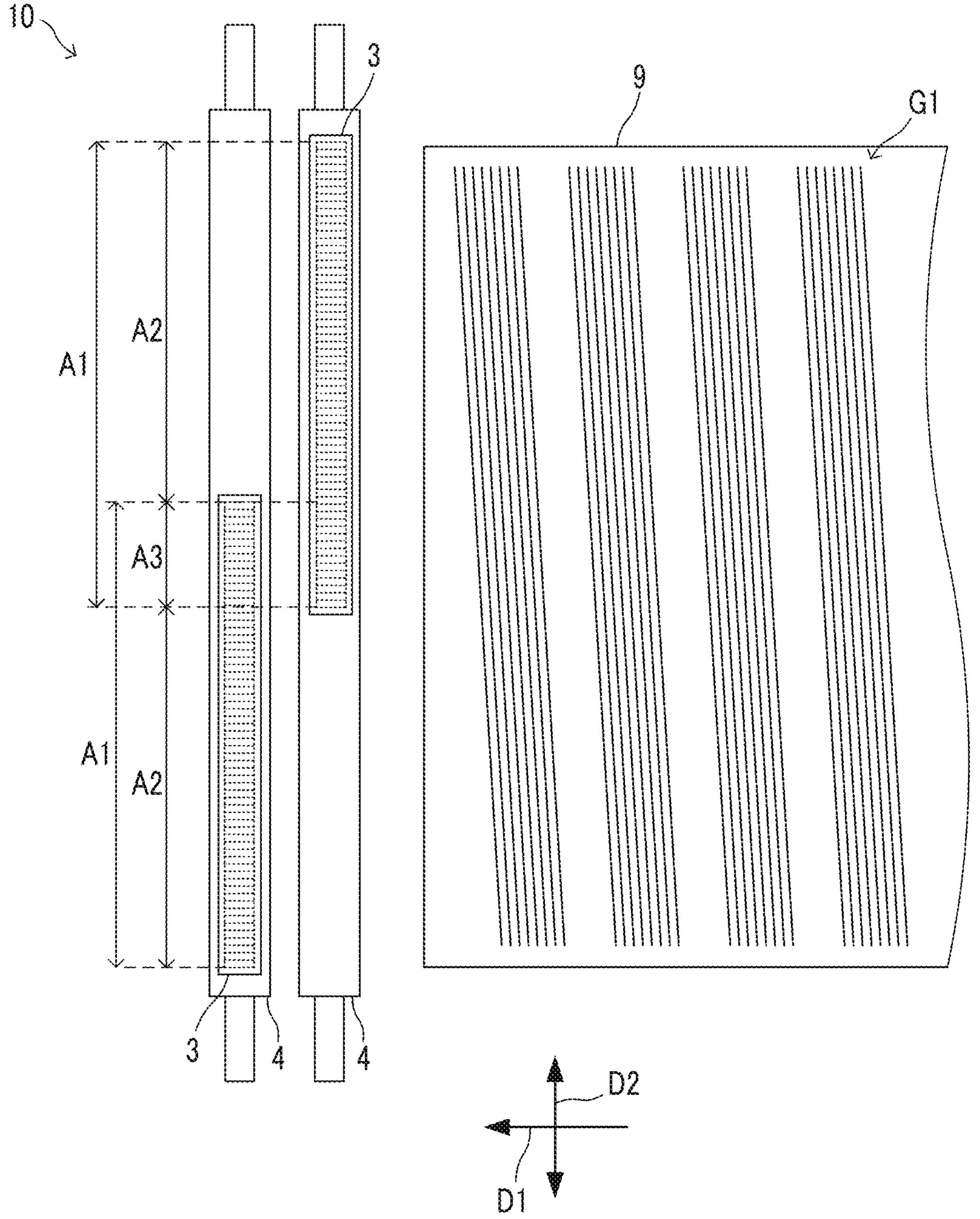
FIG. 3 is a diagram showing an example of the arrangement of a plurality of line sensors in the image forming apparatus according to the first embodiment.

The image forming apparatus 10 further includes a plurality of line sensors 3 (see FIG. 1 and FIG. 3). The plurality of line sensors 3 are disposed downstream of the printing device 5 in the sheet conveying direction D1. For example, each of the line sensors 3 is a contact image sensor (CIS).

In the present embodiment, the plurality of line sensors 3 are disposed to face an area between the belt conveyor device 22 and the secondary conveying device 23 on the conveying path 200 (see FIG. 1). The plurality of line sensors 3 are disposed at two positions shifted in the sheet conveying direction D1.

The plurality of line sensors 3 are disposed along the width direction D2 such that their positions in the width direction D2 partially overlap with each other (see FIG. 3). The plurality of line sensors 3 read images of a plurality of partial areas A1, each of which is a part of a sheet passing area in the width direction D2, from the sheet 9 (see FIG. 3). The sheet passing area is an area corresponding to the maximum width of the sheet 9 that may be used.

The plurality of partial areas A1 each include a non-overlapping area A2 and an overlapping area A3. The non-overlapping area A2 is an area of each of the plurality of partial areas A1 which does not overlap with the adjacent partial area. On the other hand, the overlapping area A3 is an area of each of the plurality of partial areas A1 which overlaps with the adjacent partial area.

The image forming apparatus 10 further includes a plurality of white reference members 4 disposed to face the plurality of line sensors 3 (see FIG. 1 and FIG. 3). Each of the white reference members 4 has a white surface.

The plurality of line sensors 3 each output data of a white image by executing a process of reading an image when the sheet 9 is not being conveyed. The white images are images representing the surfaces of the plurality of white reference members 4.

The data of the white image is used for a sensitivity adjustment process of adjusting the sensitivity of each line sensor 3. A description of the sensitivity adjustment process will be omitted.

In the present embodiment, the image forming apparatus 10 includes two roller-shaped white reference members 4 each rotatably supported. The two white reference members 4 are disposed at positions facing the two positions in the sheet conveying direction D1 where the plurality of line sensors 3 are disposed (see FIG. 1 and FIG. 3).

Since the two white reference members 4 are roller-shaped, the sheet 9 is smoothly conveyed along the peripheral surfaces of the two white reference members 4.

In the present embodiment, the image forming apparatus 10 includes two line sensors 3. In this case, the sheet passing area is divided into two non-overlapping areas A2 and one overlapping area A3. One of the two non-overlapping areas A2 and the overlapping area A3 are one of the two partial areas A1. The other one of the two non-overlapping areas A2 and the overlapping area A3 are the other one of the two partial areas A1.

The plurality of processing modules of the CPU 81 further include an image judgment portion 8*c* and an error processing portion 8*d* (see FIG. 2).

The image judgment portion 8*c* executes image quality judgment processing based on the data of each of the plurality of read images obtained by the plurality of line sensors 3. The image quality judgment processing is processing for judging whether or not the data of each of the plurality of read images satisfies a tolerance condition based on the corresponding one of a plurality of reference image data items.

The plurality of reference image data items are data representing images of a plurality of partial areas A1 in the image formed on the sheet 9. Each of the plurality of reference image data items is data representing an image that should be formed in the corresponding one of the plurality of partial areas A1 on the sheet 9.

The error processing portion 8*d* executes predetermined error processing when it is judged that the data of any of the plurality of read images does not satisfy the tolerance condition.

[Image Inspection Processing]

An example of the procedure of the image inspection processing will be described below with reference to the flowchart shown in FIG. 4. The image inspection processing is executed by the print control portion 8*b*, the image judgment portion 8*c*, and the error processing portion 8*d*.

For example, the print control portion 8*b* starts the image inspection processing each time the print processing is executed on a predetermined reference number of sheets 9.

Alternatively, the print control portion 8*b* may start the image inspection processing when an inspection request is input through the operation device 801 or the communication device 85.

In the following description, S101, S102, . . . represent identification codes of a plurality of steps in the image inspection processing. In the image inspection processing, the process of step S101 is executed first.

<Step S101>

In step S101, the print control portion 8*b* causes the sheet conveying device 2 and the printing device 5 to execute test print processing for forming a test image G1 on the sheet 9 (see FIG. 3).

The test image G1 is a predetermined pattern image. The test image G1 is formed over all of the non-overlapping areas A2 and the overlapping area A3 on the sheet 9 (see FIG. 3). The test image G1 is an example of the output image formed on the sheet 9.

The sheet conveying device 2 passes the sheet 9 with the test image G1 formed thereon through areas facing the plurality of line sensors 3.

After executing the process of step S101, the print control portion 8*b* shifts the processing to step S102.

<Step S102>

In step S102, the image judgment portion 8*c* causes the plurality of line sensors 3 to execute processing for reading the test image G1 when the sheet 9 passes through the areas facing the plurality of line sensors 3.

By executing the process of step S102, data of a plurality of read images corresponding to the images of the plurality of partial areas A1 in the test image G1 are obtained. In the present embodiment, data of two read images are obtained.

The image judgment portion 8*c* obtains the data of the two read images from the two line sensors 3, and shifts the processing to step S103.

<Step S103>

In step S103, the image judgment portion 8*c* executes the image quality judgment processing based on the data of the plurality of read images obtained in step S102.

In the image quality judgment processing, the image judgment portion 8*c* divides the data of each of the plurality of read images into first read image data and second read image data. The first read image data is data of the non-overlapping area A2 in each of the plurality of partial areas A1. The second read image data is data of the overlapping area A3 in each of the plurality of partial areas A1.

Further, the image judgment portion 8c makes judgments as to the tolerance condition individually for the first read image data and the second read image data for each partial area A1.

For example, the tolerance condition includes conditions such as a tolerance range for misalignment of a plurality of element images included in the test image G1 and a tolerance range for the difference in values of a plurality of pixel data items constituting the plurality of element images, respectively.

In the present embodiment, the image judgment portion 8c divides each of the plurality of reference image data items into first reference image data corresponding to the non-overlapping area A2 and second reference image data corresponding to the overlapping area A3. Each of the plurality of reference image data items may be divided into the first reference image data and the second reference image data in advance.

Further, the image judgment portion 8c judges for each partial area A1 whether or not the first read image data satisfies the tolerance condition based on the first reference image data.

Further, the image judgment portion 8c judges for each partial area A1 whether or not the second read image data satisfies the tolerance condition based on the second reference image data.

The image judgment portion 8c judges whether each of the non-overlapping areas A2 and the overlapping areas A3 in the plurality of partial areas A1 is in a state of image abnormality where the tolerance condition is satisfied or in a state of image abnormality where the tolerance condition is not satisfied.

After executing the process of step S103, the image judgment portion 8c shifts the processing to step S104.

<Step S104>

In step S104, the image judgment portion 8c selects the next processing to be executed in accordance with whether or not there is an area judged to involve the image abnormality in the plurality of partial areas A1.

The image judgment portion 8c shifts the processing to step S105 when there is an area judged to involve the image abnormality in the plurality of partial areas A1. On the other hand, the image judgment portion 8c ends the image quality judgment processing when there is no area judged to involve the image abnormality in the plurality of partial areas A1.

<Step S105>

In step S105, the image judgment portion 8c selects the next processing to be executed in accordance with whether or not there is an inconsistency in the judgment result of the tolerance condition for the overlapping area A3.

The inconsistency in the judgment result of the tolerance condition is a situation in which it is judged that the data of only one of two adjacent partial areas in the plurality of partial areas A1 does not satisfy the tolerance condition for the overlapping area A3 common to the two adjacent partial areas.

A first example of the situation in which there is no inconsistency in the judgment result of the tolerance condition is a situation in which it is judged that the data of both of the two adjacent partial areas do not satisfy the tolerance condition for the overlapping area A3 common to the two adjacent partial areas.

A second example of the situation in which there is no inconsistency in the judgment result of the tolerance conditions is a situation in which it is judged that the data of both of the two adjacent partial areas satisfy the tolerance condition for the overlapping area A3 common to the two adjacent partial areas. In the second example, it is judged that any one item of the first read image data does not satisfy the tolerance condition.

The image judgment portion 8c shifts the processing to step S106 when there is no inconsistency in the judgment result of the tolerance condition for the overlapping area A3. On the other hand, the image judgment portion 8c shifts the processing to step S107 when there is an inconsistency in the judgment result of the tolerance condition for the overlapping area A3.

That is, when it is judged that the data of both of the two adjacent partial areas in the plurality of partial areas A1 do not satisfy the tolerance condition for the overlapping area A3 common to the two adjacent partial areas, the process of step S106 is executed.

On the other hand, when it is judged that the data of only one of the two adjacent partial areas in the plurality of partial areas A1 does not satisfy the tolerance condition for the overlapping area A3 common to the two adjacent partial areas, the process of step S107 is executed.

<Step S106>

In step S106, the error processing portion 8d executes predetermined first error processing. A specific example of the first error processing will be described later. The error processing portion 8d ends the image quality judgment processing after executing the first error processing.

<Step S107>

In step S107, the error processing portion 8d executes second error processing that is different from the first error processing. A specific example of the second error processing will be described later. The error processing portion 8d ends the image quality determination processing after executing the second error processing.

[First Error Processing]

Next, an example of the procedure of the first error processing will be described with reference to the flowchart shown in FIG. 5.

In the following description, S201, S202, . . . represent identification codes of a plurality of steps in the first error processing. In the first error processing, the process of step S201 is executed first.

<Step S201>

In step S201, the error processing portion 8d prohibits new print processing.

For example, when the image inspection processing is executed while continuous print processing is being executed, the subsequent print processing is not executed until the prohibition of the print processing is lifted.

After executing the process of step S201, the error processing portion 8d shifts the processing to step S202.

<Step S202>

In step S202, the error processing portion 8d executes first inquiry processing. The first inquiry processing includes a process of notifying a situation in which the image abnormality is detected.

Furthermore, the first inquiry processing includes a process of inquiring whether to re-execute the image inspection processing or to lift the prohibition of the print processing.

For example, the error processing portion 8d executes the first inquiry processing through the human interface device 800 of the image forming apparatus 10.

Alternatively, the error processing portion 8d may transmit inquiry information to the host apparatus 7 through the communication device 85 to execute the first inquiry processing through the human interface device 70 of the host apparatus 7.

The user checks notification information by the first inquiry processing and then performs an adjustment process selected from among a plurality of adjustment candidates. For example, the plurality of adjustment candidates include an operation of causing the operation device 801 to cause the image forming apparatus 10 to execute various adjustment processes such as a head cleaning process or a print density correction process.

Further, the plurality of adjustment candidates include cleaning the sheet conveying device 2 or the conveying path 200.

After executing the process of step S202, the error processing portion 8*d* shifts the processing to step S203.

<Step S203>

In step S203, the error processing portion 8*d* selects the next processing in accordance with whether or not a re-inspection instruction has been input as a response to the first inquiry processing. The re-inspection instruction is an instruction for requesting re-execution of the image inspection processing.

Normally, the user performs an operation corresponding to the re-inspection instruction on the human interface device 800 of the image forming apparatus 10 or the human interface device 70 of the host apparatus 7 after performing the adjustment process.

The error processing portion 8*d* shifts the processing to step S204 when the re-inspection instruction has not been input, and shifts the processing to step S205 when the re-inspection instruction has been input.

<Step S204>

In step S204, the error processing portion 8*d* selects the next processing in accordance with whether or not a lifting instruction has been input as a response to the first inquiry processing. The lifting instruction is an instruction for requesting lifting of the prohibition of the print processing.

When the user visually determines that the image quality of the test image G1 is acceptable, the user performs an operation corresponding to the lifting instruction on the human interface device 800 of the image forming apparatus 10 or the human interface device 70 of the host apparatus 7.

The error processing portion 8*d* shifts the processing to step S203 when the lifting instruction has not been input, and shifts the processing to step S206 when the lifting instruction has been input.

<Step S205>

In step S205, the error processing portion 8*d* starts the image inspection processing. As a result, the processes from step S101 shown in FIG. 4 are executed again. The error processing portion 8*d* ends the first error processing when the image inspection processing is started.

<Step S206>

In step S206, the error processing portion 8*d* lifts the prohibition of the print processing. Thus, the image forming apparatus 10 shifts to a state in which the print processing can be executed.

The error processing portion 8*d* ends the first error processing after executing the process of step S206.

[Second Error Processing]

Next, an example of the procedure of the second error processing will be described with reference to the flowchart shown in FIG. 6.

In the following description, S301, S302, . . . represent identification codes of a plurality of steps in the second error processing. In the second error processing, the process of step S301 is executed first.

<Step S301>

In step S301, the error processing portion 8*d* prohibits new print processing as in step S201.

After executing the process of step S301, the error processing portion 8*d* shifts the processing to step S302.

<Step S302>

In step S302, the error processing portion 8*d* executes second inquiry processing. The second inquiry processing includes a process of notifying a situation in which the image abnormality is detected and a situation in which there is an inconsistency in the judgment result of the tolerance condition.

Furthermore, the second inquiry processing includes a process of inquiring whether to re-execute the image inspection processing or to execute invalid sensor setting.

The invalid sensor setting is to set one of the two adjacent line sensors corresponding to the overlapping area A3 where the inconsistency has occurred as an invalid sensor.

The two adjacent line sensors are two line sensors corresponding to the overlapping area A3 where the inconsistency has occurred among the plurality of line sensors 3. In other words, the two adjacent line sensors are two line sensors corresponding to the overlapping area A3 that caused the second error processing among the plurality of line sensors 3.

If there is an inconsistency for the overlapping area A3, one of the two adjacent line sensors may be abnormal. The user determines the states of the two adjacent line sensors after confirming the notification information by the second inquiry processing.

In the present embodiment, the image forming apparatus 10 includes two line sensors 3. In this case, these two line sensors 3 are the two adjacent line sensors.

For example, the error processing portion 8*d* executes the second inquiry processing through the human interface device 800 of the image forming apparatus 10.

Alternatively, the error processing portion 8*d* may transmit inquiry information to the host apparatus through the communication device 85 to execute the second inquiry processing through the display portion of the host apparatus.

The user confirms the notification information by the second inquiry processing and then performs an adjustment process selected from the plurality of adjustment candidates.

After executing the process of step S302, the error processing portion 8*d* shifts the processing to step S303.

<Step S303>

In step S303, the error processing portion 8*d* selects the next processing in accordance with whether or not a re-inspection instruction has been input as a response to the second inquiry processing as in step S203.

Normally, the user performs an operation corresponding to the re-inspection instruction on the human interface device 800 of the image forming apparatus 10 or the human interface device 70 of the host apparatus 7 after performing the adjustment process.

The error processing portion 8*d* shifts the processing to step S304 when the re-inspection instruction has not been input, and shifts the processing to step S305 when the re-inspection instruction has been input.

<Step S304>

In step S304, the error processing portion 8*d* selects the next processing in accordance with whether or not an invalidation setting instruction has been input as a response to the second inquiry processing.

The invalidation setting instruction is an instruction requiring one of the two adjacent line sensors corresponding to the overlapping area A3 where the inconsistency has occurred be set as an invalid sensor. The input of the invalidation setting instruction is an example of the input of invalidation instruction information.

When the user determines that one of the two adjacent sensors corresponding to the inconsistency for the overlapping area A3 is abnormal, the user performs an operation corresponding to the invalidation setting instruction on the human interface device 800 of the image forming apparatus 10 or the human interface device 70 of the host apparatus 7.

The error processing portion 8*d* shifts the processing to step S303 when the invalidation setting instruction has not been input, and shifts the processing to step S306 when the invalidation setting instruction has been input.

<Step S305>

In step S305, the error processing portion 8*d* starts the image inspection processing. As a result, the processes from step S101 shown in FIG. 4 are executed again. The error processing portion 8*d* ends the second error processing when the image inspection processing is started.

<Step S306>.

In step S306, the error processing portion 8*d* sets one of the two adjacent line sensors as the invalid sensor in accordance with the invalidation setting instruction.

Figure 4:
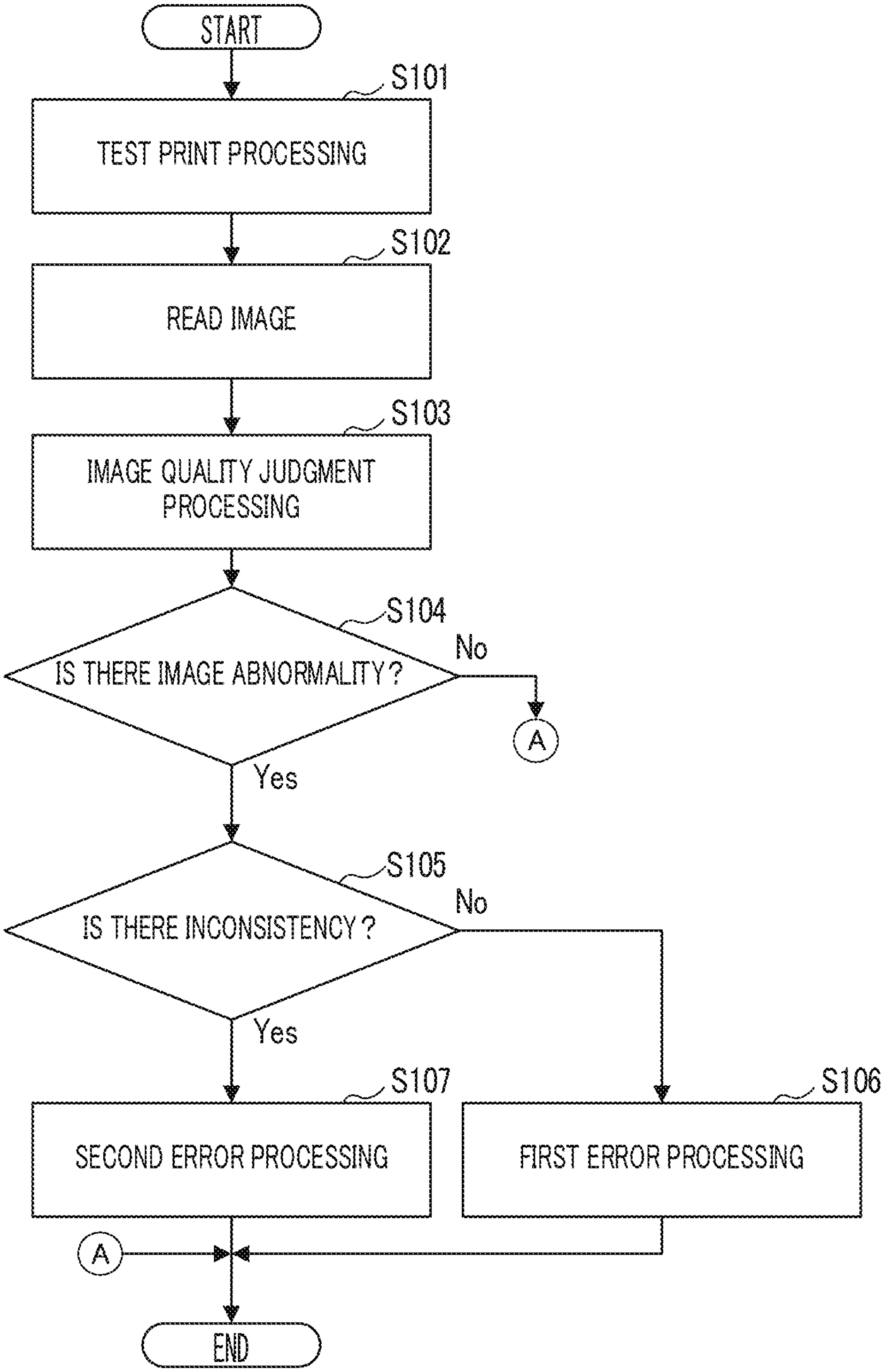
FIG. 4 is a flowchart showing an example of the procedure of image inspection processing in the image forming apparatus according to the first embodiment.

In the image quality judgment processing in step S103, the image judgment portion 8*c* makes a judgment as to the tolerance condition only for the data corresponding to the valid line sensor that is not set as the invalid sensor among the plurality of line sensors 3 (see FIG. 4).

After executing the process of step S306, the error processing portion 8*d* shifts the processing to step S307.

<Step S307>

In step S307, the error processing portion 8*d* lifts the prohibition of the print processing. Thus, the image forming apparatus 10 shifts to a state in which the print processing can be executed.

The error processing portion 8*d* ends the second error processing after executing the process of step S307.

The adoption of the image forming apparatus 10 allows the line sensors 3 used to judge the quality of the output image to be shared among a plurality of models.

Further, by judging whether or not there is an inconsistency for the overlapping area A3, it is possible to grasp whether or not a part of the plurality of line sensors 3 is abnormal.

In addition, even when an abnormality occurs in a part of the plurality of line sensors 3, setting of the invalid sensor allows the image inspection processing using the valid line sensor to be executed until the abnormal part is replaced.

Second Embodiment

Figure 7:
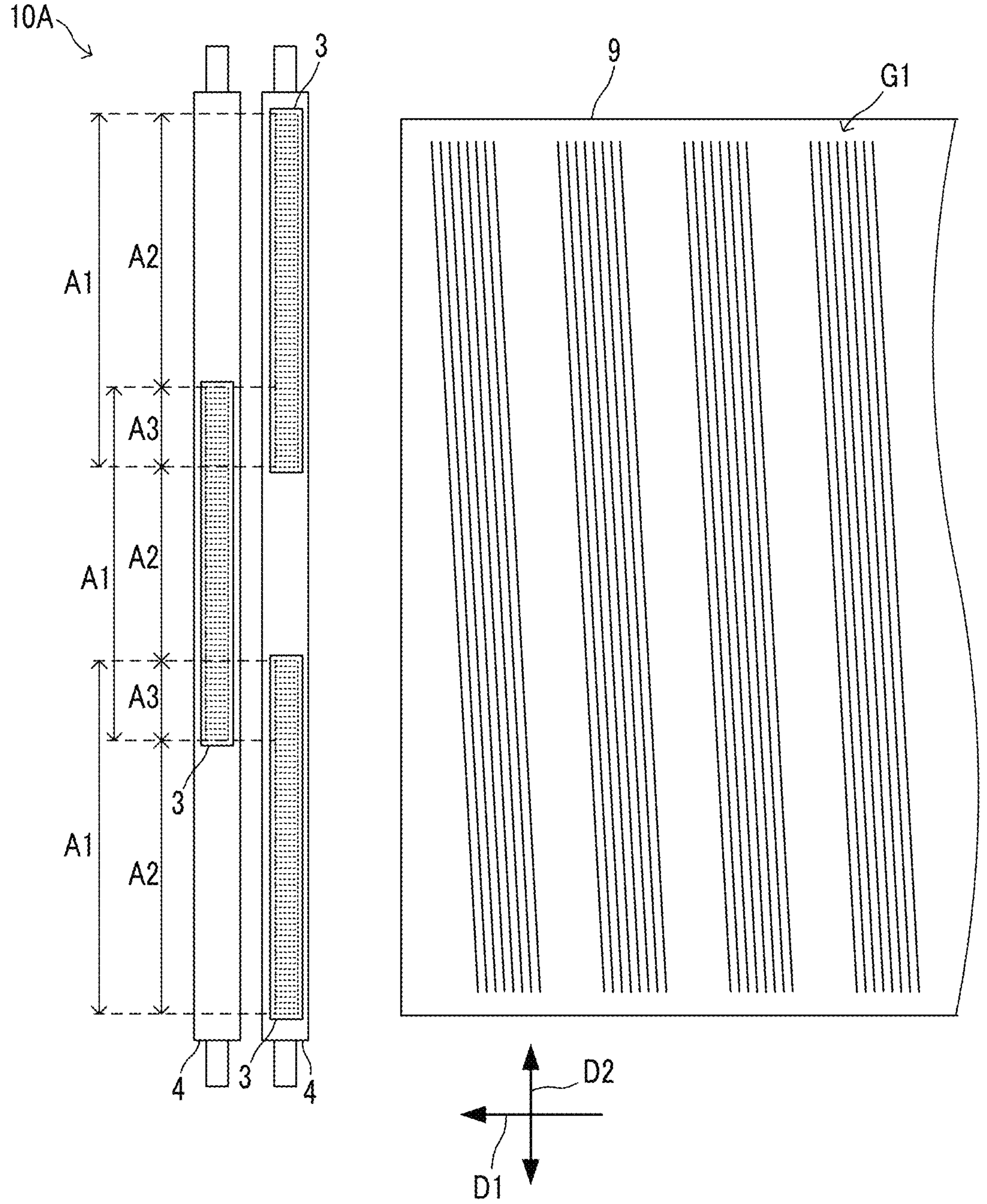
FIG. 7 is a diagram showing an example of the arrangement of a plurality of line sensors in an image forming apparatus according to a second embodiment.

Next, an image forming apparatus 10A according to a second embodiment will be described with reference to FIG. 7. In FIG. 7, the same constituent elements as those shown in FIG. 3 are given the same reference numerals.

Hereinafter, the differences from the image forming apparatus 10 in the image forming apparatus 10A will be described. The image forming apparatus 10A differs from the image forming apparatus 10 in terms of including three line sensors 3.

In the image forming apparatus 10A, the three line sensors 3 are disposed along the width direction D2 such that their positions in the width direction D2 partially overlap with each other. The three line sensors 3 read images of three partial areas A1, each of which is a part of the sheet passing area in the width direction D2, from the sheet 9.

The three partial areas A1 each include a non-overlapping area A2 and an overlapping area A3. In the image forming apparatus 10A, the sheet passing area is divided into three non-overlapping areas A2 and two overlapping areas A3.

In the image forming apparatus 10A, one of the two white reference members 4 is disposed to face two of the three line sensors 3, and the other of the two white reference members 4 is disposed to face the remaining one of the three line sensors 3.

Figure 5:
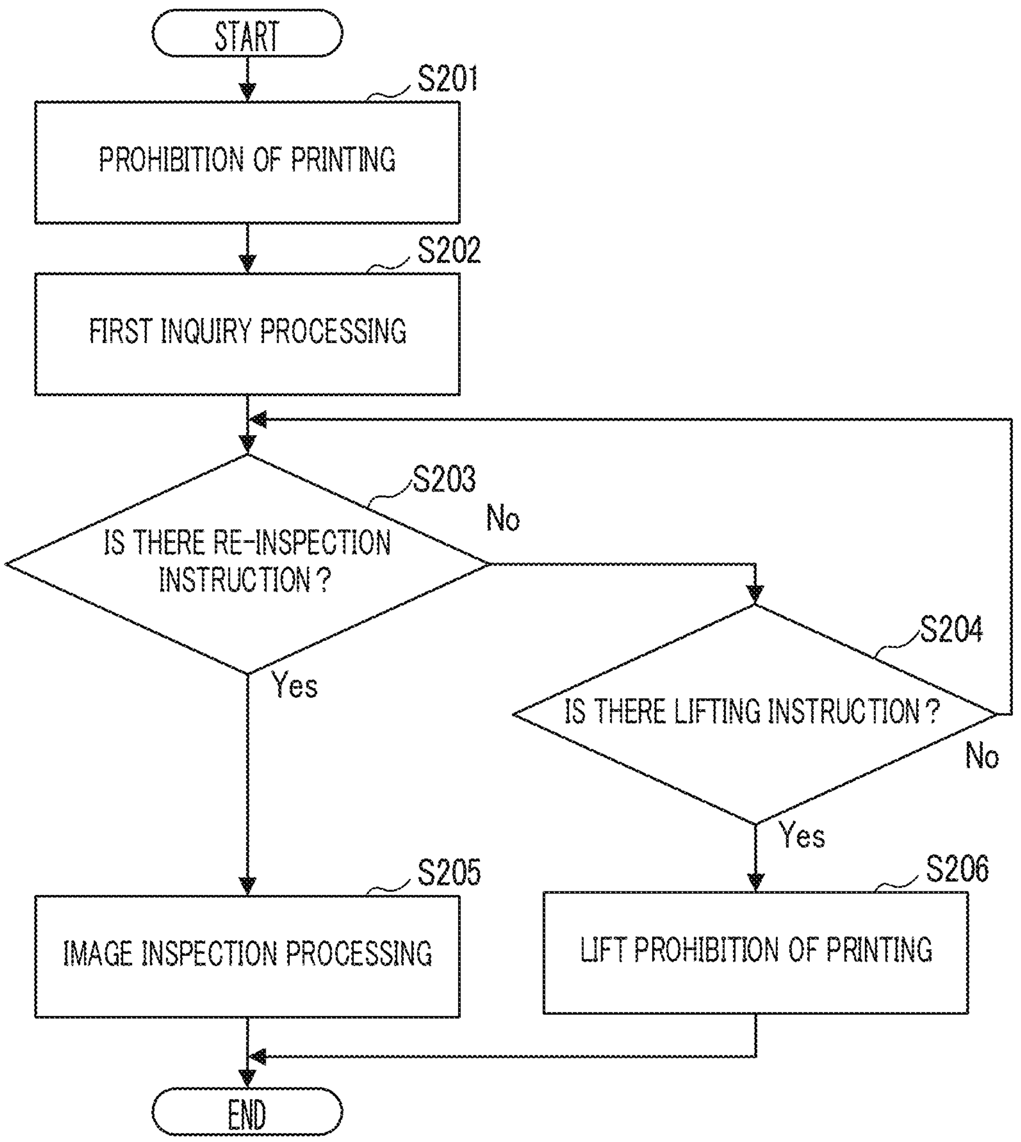
FIG. 5 is a flowchart showing an example of the procedure of first error processing, which is a part of the image inspection processing, in the image forming apparatus according to the first embodiment.
Figure 6:
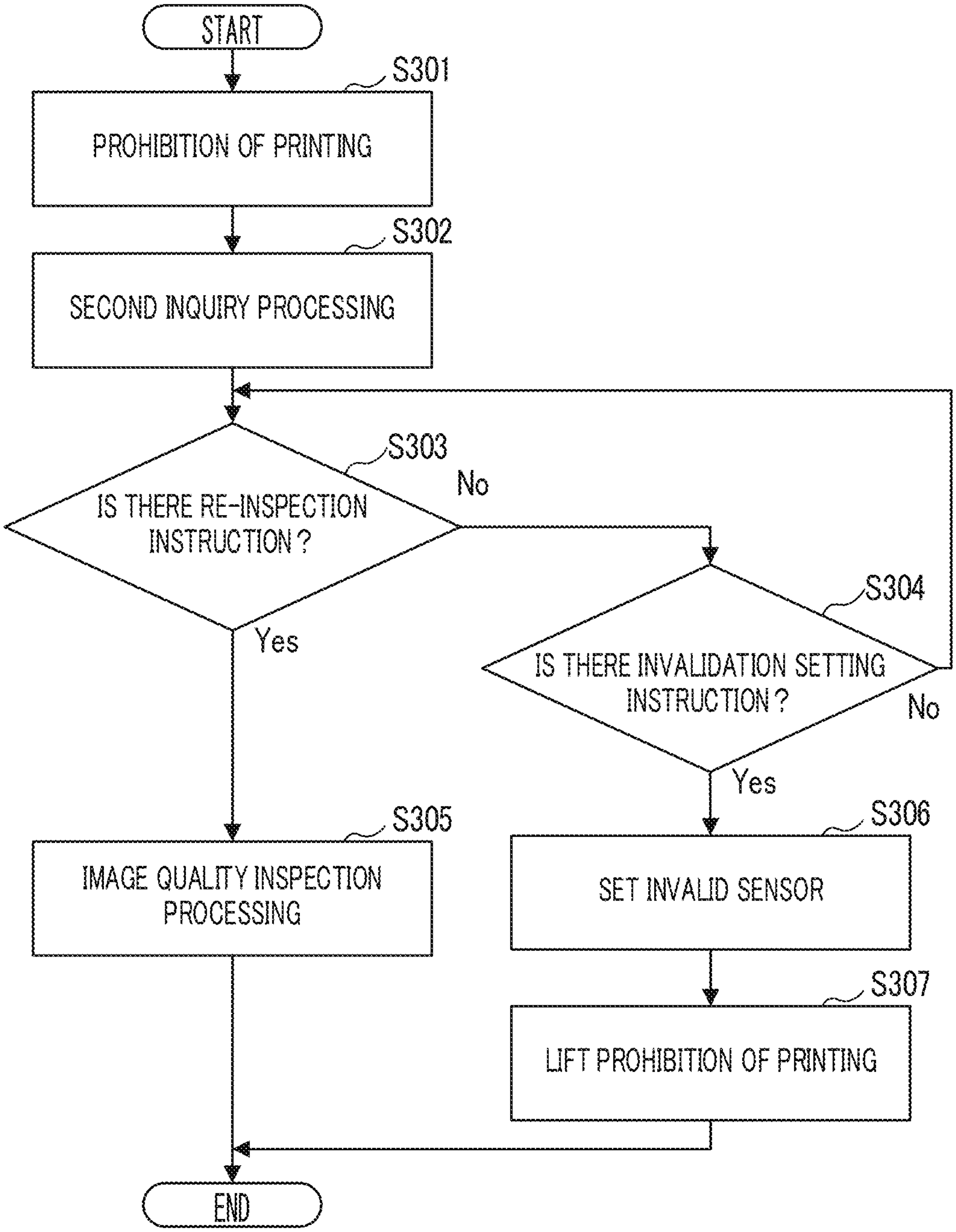
FIG. 6 is a flowchart showing an example of the procedure of second error processing, which is a part of the image inspection processing, in the image forming apparatus according to the first embodiment.

Also in the image forming apparatus 10A, the print control portion 8*b*, the image judgment portion 8*c*, and the error processing portion 8*d* execute the image inspection processing (see FIG. 4 to FIG. 6).

Even when the image forming apparatus 10A is employed, the same effects as those when the image forming apparatus 10 is employed can be obtained.

Application Example

The image forming apparatus 10A may include four or more line sensors 3.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image forming apparatus comprising:

a printing device configured to form an image on a sheet conveyed along a conveying path;

a plurality of line sensors disposed downstream of the printing device in a sheet conveying direction along a width direction intersecting the sheet conveying direction, with respective positions in the width direction partially overlapping with each other, and configured to read images of a plurality of partial areas from the sheet, each of the partial areas including a non-overlapping area which does not overlap with an adjacent area and an overlapping area which overlaps with the adjacent area, each of which is a part of a sheet passing area in the width direction;

an image judgment portion configured to judge whether or not data of each of a plurality of read images obtained by the plurality of line sensors satisfies a tolerance condition based on a corresponding one of a plurality of reference image data items representing the images of the plurality of partial areas; and an error processing portion configured to execute predetermined error processing when it is judged that the data of any of the plurality of read images does not satisfy the tolerance condition, wherein the image judgment portion individually makes judgments as to the tolerance condition for the data of the non-overlapping area and the data of the overlapping area in each of the plurality of partial areas, the error processing portion executes first error processing when it is judged that both of the data of two adjacent partial areas in the plurality of partial areas do not satisfy the tolerance condition for the overlapping area common to the two adjacent partial areas, and the error processing portion executes second error processing different from the first error processing when it is judged that the data of only one of the two adjacent partial areas in the plurality of partial areas does not satisfy the tolerance condition for the overlapping area common to the two adjacent partial areas.

2. The image forming apparatus according to claim 1, wherein the second error processing includes:

a process of inquiring, through a human interface device, whether or not to set one of two adjacent line sensors corresponding to the overlapping area which has caused the second error processing among the plurality of sensors as an invalid sensor; and a process of, when invalidation instruction information for instructing the setting of the invalid sensor is input through the human interface device, setting one of the two adjacent line sensors as the invalid sensor in accordance with the invalidation instruction information, and the image judgment portion makes a judgment as to the tolerance condition only for data corresponding to a valid line sensor that is not set as the invalid sensor among the plurality of line sensors.

* * * * *